United States Patent [19]

Takahashi et al.

[11] Patent Number: 4,599,561
[45] Date of Patent: Jul. 8, 1986

[54] DEVICE FOR DETECTING THE RELATIVE AND ABSOLUTE POSITION OF A MOVING BODY

[75] Inventors: Tadashi Takahashi; Kunio Miyashita, both of Hitachi; Hiroshi Hayashida, Mito, all of Japan

[73] Assignee: Hitachi, Ltd., Tokyo, Japan

[21] Appl. No.: 432,685

[22] Filed: Oct. 4, 1982

[30] Foreign Application Priority Data

Oct. 6, 1981 [JP] Japan .................. 56-158088

[51] Int. Cl.$^4$ .................. G01B 7/14; H01L 43/08
[52] U.S. Cl. .................. 324/208; 324/252; 338/32 R
[58] Field of Search .................. 324/207, 208, 252; 338/32 R; 310/68 B; 318/653; 340/347 P

[56] References Cited

U.S. PATENT DOCUMENTS 4,053,826  10/1977  Wasawa et al. .................. 324/208
4,274,053  6/1981   Ito et al. .................. 324/208

Primary Examiner—Ernest F. Karlsen
Assistant Examiner—Walter E. Snow
Attorney, Agent, or Firm—Antonelli, Terry & Wands

[57] ABSTRACT

An encoder with a position detecting device is disclosed which is applicable to a brushless motor or the like, and includes a rotating body provided on a surface thereof with a magnetic material and magnetoresistive elements disposed opposite to and in close proximity to said magnetic material. The rotating body is provided with an encoding track in which a magnetic signal has been recorded in a predetermined direction of magnetization, and a position detecting track in which a magnetic signal has been recorded in a direction of magnetization intersecting with the predetermined direction of magnetization. The magnetoresistive elements are formed on an insulating substrate and face the tracks. Further, the magnetoresistive elements are arranged side by side in a radial direction of the rotating body and each of the magnetoresistive elements is placed so that the magnetoresistive element intersects the direction of magnetization in a track facing the magnetoresistive element, to make small the magnetoresistive element supporting substrate, thereby making the whole of the encoder small in size, and to prevent magnetic interference between the encoding track and position detecting track, thereby enhancing the performance of the encoder with the position detecting device.

12 Claims, 10 Drawing Figures

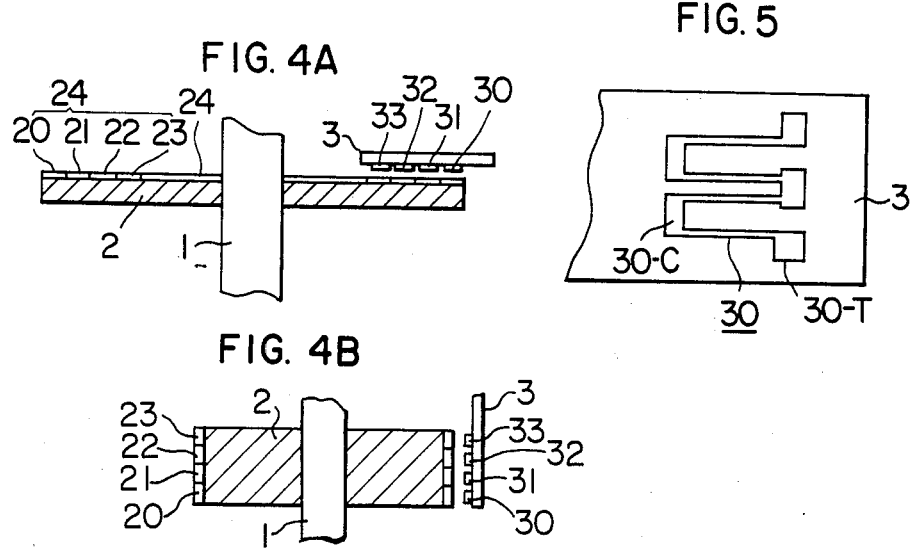
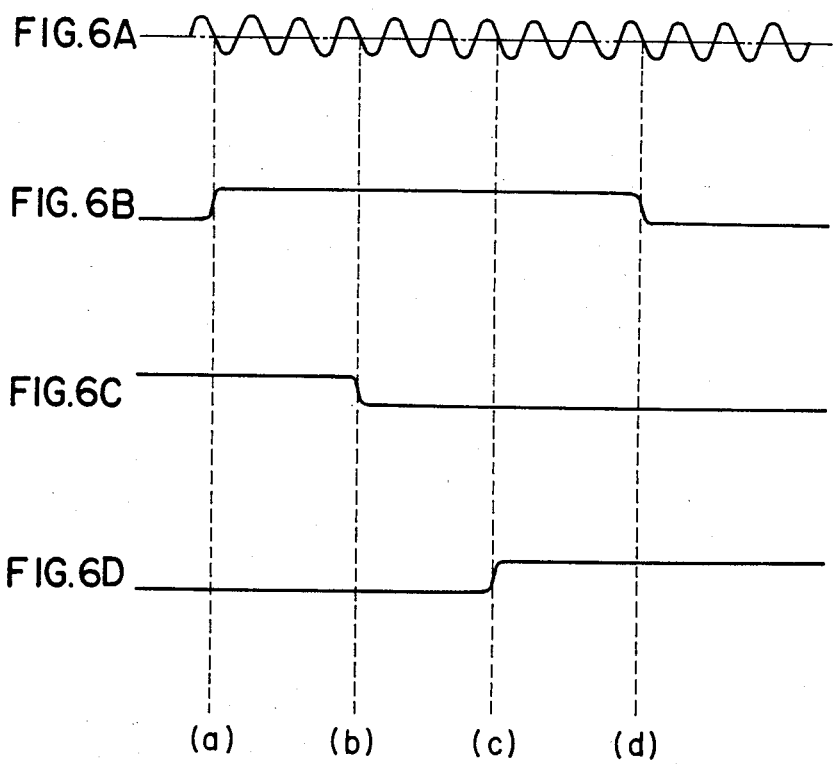

DEVICE FOR DETECTING THE RELATIVE AND ABSOLUTE POSITION OF A MOVING BODY

The present invention relates to an encoder with a position detecting device, and more particularly to a magnetic encoder. Further, the present invention relates to an encoder which can obtain a signal for performing speed control or position control in a brushless motor or the like and a signal for making the changeover of phase (that is, commutation) in such a machine.

Figure 1:
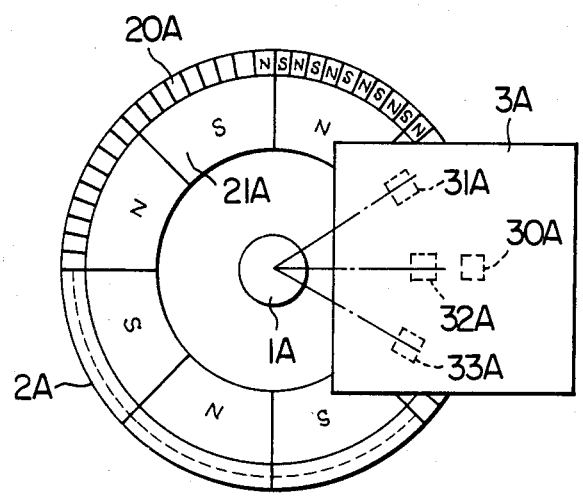
Figure 2:
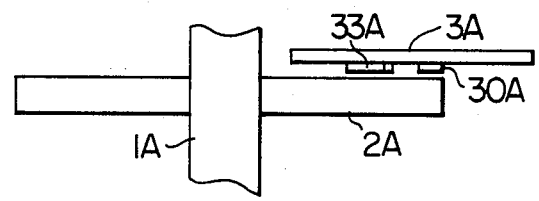

FIGS. 1 and 2 show a conventional encoder with a position detecting device. In FIGS. 1 and 2, reference symbol 1A designates a shaft of a rotating machine such as a brushless motor, 2A a rotating body, 3A a substrate for supporting a magnetoresistive element (hereinafter referred to as an "MR element"), 20A an encoding track, 21A a position detecting track, 30A an encoding MR element, and 31A, 32A and 33A position detecting MR elements (for U-, V- and W-phases).

As shown in FIG. 1, the encoding track 20A included in an encoding part and the position detecting track 21A included in a position detecting part are separately provided on the rotating body 2A. Further, the encoding MR element 30A which faces the encoding track 20A and is included in the encoding part, and the position detecting MR elements 31A, 32A and 33A which face the position detecting track 21A and are included in the position detecting part, are provided on the substrate 3A. As shown in FIG. 2, the MR elements 30A, 31A, 32A and 33A are spaced apart from the rotating body 2A by a small distance, for example, tens of microns.

Since the conventional encoder has such a structure, when the rotating body 2A makes a turn, the encoding track 20A containing a magnetic signal recorded thereon is rotated, and the encoding MR element 30A facing the encoding track 20A generates an output in accordance with the magnetic signal.

Further, in the case where the brushless motor is a 3-phase motor, the position detecting MR elements 31A, 32A and 33A included in the position detecting part are arranged in such a manner that they are separated from each other by 120° in terms of electrical angle. When the rotating body 2A makes a turn, the position detecting track 21A is rotated, and the position detecting MR elements 31A, 32A and 33A generate signals of U-, V- and W-phases, respectively.

In the above-mentioned conventional encoder, however, it is inevitable that the substrate 3A for supporting the MR elements becomes large, since the position detecting MR elements 31A, 32A and 33A are separated from each other by 120° (in terms of electrical angle) as described above.

Usually, the MR elements are formed through evaporation techniques or the like. Accordingly, when the substrate for supporting the MR elements is large in size, the substrate provided with the MR elements is high in cost, low in yield rate, and unsuitable for mass production.

Further, in a system in which a magnetic signal for detecting the position of the rotating body 2A is recorded in the whole of an annular region of the rotating body 2A, the MR elements are always subjected to a positive or negative magnetic field.

In general, positive and negative magnetic fields produce the same change in the resistance of an MR element, and therefore the MR element cannot discriminate between the positive and negative magnetic fields.

In the above system, it is necessary to apply a magnetic bias to each of the MR elements to discriminate between positive and negative magnetic fields.

Further, in both of the encoding part and the position detecting part, the magnetic signal is recorded along the circumference of the rotating body. Accordingly, the recorded magnetic signals interact with each other, that is, magnetic interference is generated, and therefore a stable output cannot be obtained.

It is accordingly an object of the present invention to provide an encoder with a position detecting device in which a substrate for supporting MR elements is made small to make the encoder small-sized, the substrate provided with the MR elements is fabricated at a high yield rate and can be readily mass-produced, the position of a rotating body can be detected without applying a magnetic bias to each of the MR elements, and magnetic interference between an encoding part and a position detecting part can be eliminated.

In order to attain the above object, according to the present invention, there is provided an encoder including a rotating body attached to a rotating shaft and provided on a surface thereof with a magnetic material, and MR elements disposed opposite to the rotating body, in which encoder an encoding track and a position detecting track are separately provided on the rotating body, a magnetic signal is recorded in each of the tracks so that the direction of magnetization in one of the tracks and that in the other track intersect each other, the MR elements are provided on an insulating substrate in such a manner that they are arranged side by side in a radial direction of the rotating body, and an encoding MR element and a position detecting MR element intersect the direction of magnetization in the encoding track facing the encoding MR element and the direction of magnetization in the position detecting track facing the position detecting MR element, respectively.

Further, in the case where the present invention is applied to a brushless motor, a position detecting portion of the rotating body is divided into a plurality of parts, the number of which is equal to the number of phases of the brushless motor, and the direction of magnetization in the position detecting portion is made perpendicular to that in an encoding portion of the rotating body, in order to arrange the MR elements in a line along a radial direction of the rotating body, thereby greatly reducing the size of the substrate for supporting the MR elements, and to eliminate magnetic interference between the encoding portion and position detecting portion. Further, a magnetic signal is recorded in each of the above-mentioned parts of the position detecting portion in such a manner that a signal recording area and a non-recording area are alternately provided at intervals of 180° in terms of electrical angle, to take out position signals accurately.

Figure 3:
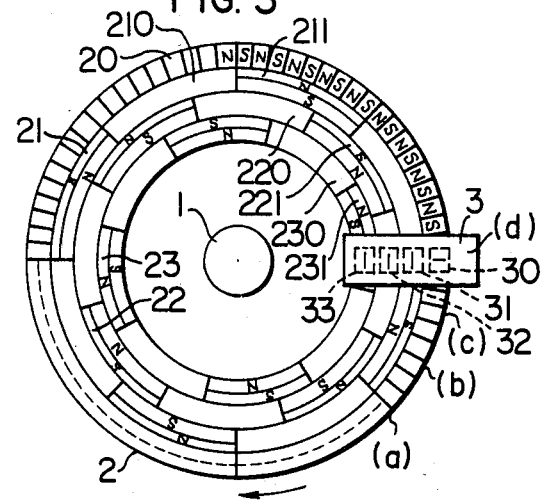

The present invention will be apparent from the following detailed description taken in conjunction with the accompanying drawings, in which:

FIGS. 1 and 2 show a conventional encoder, FIG. 1 is a plan view of the conventional encoder, and FIG. 2 is a side view showing a portion of the conventional encoder; and FIGS. 3 to 5 and 6A to 6D show an embodiment of an encoder according to the present invention, FIG. 3 is a plan view of the embodiment in which a 3-phase, 8-pole brushless motor is used, FIGS. 4A and 4B are sectional views for diagrammatically distinguishing between tracks in the embodiment, FIG. 5 is an enlarged plan view showing a main part of an MR element in the embodiment, and FIGS. 6A to 6D are waveform charts for explaining the operation of the embodiment.

Now, an embodiment of an encoder according to the present invention will be explained, with reference to FIGS. 3 to 5 and 6A to 6D. As mentioned above, FIG. 3 is a plan view showing an embodiment of the present invention which includes a 3-phase, 8-pole brushless motor, FIGS. 4A and 4B are sectional views for diagrammatically distinguishing between tracks in the embodiment, FIG. 5 is an enlarged plan view showing main part of a substrate provided with MR elements (and shows the back side of the substrate 3 shown in FIG. 3), and FIGS. 6A to 6D are waveform charts for explaining the operation of the embodiment. In FIGS. 3 to 5, reference numeral 1 designates the shaft of a brushless motor, 2 a rotating body made of a non-magnetic material such as aluminum or plastics, 3 a substrate for supporting MR elements, 20 an encoding track, 21 to 23 position detecting tracks (for U-, V- and W-phases), 24 a magnetic material, 210, 220 and 230 non-recording areas in the position detecting tracks 21, 22 and 23, and 211, 221 and 231 signal recording areas in the tracks 21, 22 and 23. Further, reference numeral 30 designates an encoding MR element, 30-T a terminal part of the encoding MR element 30, 30-C a connecting part of the encoding MR element, and 31, 32 and 33 position detecting MR elements (for U-, V- and W-phases).

In FIG. 3, broken lines are used only for indicating the presence of elements or others, and longitudinal and transverse solid lines in the MR elements each bounded by a broken line indicate the direction in which an MR element is placed.

The rotating body 2 is attached to the shaft 1, and the magnetic material 24 is carried by the surface of the rotating body 2. The substrate 3 provided with the encoding MR element 30 and the position detecting MR elements 31, 32 and 33 is fixed so that the substrate 3 and the rotating body 2 face each other with a gap therebetween.

Further, the magnetic material 24 on the rotating body 2 includes the encoding track 20 and the position detecting tracks 21, 22 and 23 for U-, V- and W-phases, which correspond to the encoding MR elements 30 and the position detecting MR elements 31, 32 and 33 for U-, V- and W-phases.

The MR element supporting substrate 3 is made of an insulating material such as glass, and the MR elements made of permalloy or others are arranged in a line on that surface of the substrate 3 which faces the rotating body 2. The resistance of each of the MR elements is varied by a magnetic field perpendicular to the direction of a solid line within a square portion (namely, an MR element) which is bounded by a broken line in FIG. 3.

That is, the encoding MR element 30 is placed in a radial direction of the rotating body 2, and the position detecting MR elements 31, 32 and 33 are placed in directions perpendicular to the radial direction.

Further, the encoding track 20 is provided on the outermost one of concentric circles which are drawn on the rotating body 2, and magnetic poles S and N are formed along the circumference of the outermost concentric circle as shown in FIG. 3 to record a magnetic signal. The position detecting track 21 for U-phase is provided inside the encoding track 20, and includes signal recording areas 211 each having a central angle corresponding to an electrical angle of 180°. In the signal recording areas, magnetic poles S and N are formed in the radial direction. Non-recording areas 210 each having a central angle corresponding to an electrical angle of 180° and containing no magnetic signal are provided on both sides of a signal recording area 211. Further, on either side of each non-recording area 210, the signal recording areas 211 are provded such that the magnetic poles N and S are disposed oppositely in the radial direction. That is, the one signal recording area 211 has its N and S poles disposed opposite to the adjacent signal recording areas 211 in the same track.

As has been explained above, a magnetic signal is recorded in the track 21 at four signal recording areas, which correspond to one-half the number of poles of the 3-phase, 8-pole brushless motor.

The position detecting track 22 for the V-phase is provided inside the position detecting track 21 for the U-phase in such a manner that the signal recording area 221 with a magnetic signal recorded therein is shifted from the signal recording area 211 by 120° in terms of electrical angle. The magnetic signal is recorded in the same manner as in the track 21 for the U-phase. However, as shown in FIG. 3, the magnetic signal is recorded so that an S-pole is formed in that portion of the track 22 which is adjacent to an S-pole in the track 21, and an N-pole is formed in that portion of the track 22 which is adjacent to an N-pole in the track 21. The track 22 includes the non-recording areas 220 in addition to the signal recording areas 221.

Further, the position detecting track 23 for the W-phase is provided inside the position detecting track 22 for the V-phase in such a manner that the signal recording area 231 with a magnetic signal recorded therein is shifted from the signal recording area 221 by 120° in terms of electrical angle. The magnetic signal is recorded in the track 23 in such a manner that the same magnetic pole S or N is formed in adjacent portions of the tracks 22 and 23 as shown in FIG. 3. The track 23 includes the non-recording areas 230 in addition to the signal recording areas 231.

Since the magnetic poles N and S are formed in the tracks 20, 21, 22 and 23 in the above-mentioned manner, the direction of magnetization in the encoding track 20 is parallel to the circumference of the rotating body, and the direction of magnetization in the position detecting track 21 is parallel to the radial direction of the rotating body. That is, these directions of magnetization intersect each other. Thus, the magnetization in the encoding track 20 and that in the position detecting track 21 scarcely interact with each other.

Further, the encoding track 20 and position detecting tracks 21, 22 and 23 may be provided only in a circumferential portion of the rotating body 2, as shown in FIG. 4B, and one of the above-mentioned two structures can be readily formed on the basis of design. In this case, the encoding track is magnetized in the circumferential direction and the position detecting tracks are magnetized in the axial direction.

Next, the operation and advantages of the present embodiment will be explained, with reference to waveform charts shown in FIGS. 6A to 6D.

Now, let us consider the case where the rotating body 2 is rotated in a direction of the arrow from a point a to a point d, as shown in FIG. 3. In this case, the magnetic field applied to the MR element 30 varies a plurality of times, the number of which is equal to the number of magnetic poles S and N recorded between the point a and point d, and the resistance of the MR element 30 varies in accordance therewith. Therefore, when a current is caused to flow through the MR element 30, such an output signal as shown in FIG. 6A is obtained. That is, the number of peaks in the output signal is twice the number of peaks in a corresponding magnetic signal, since the MR element 30 cannot discriminate between magnetic poles S and N.

Further, the position detecting MR elements 31, 32 and 33 for U-, V- and W-phases produce output signals shown in FIGS. 6B, 6C and 6D.

First, let us consider the output signal of U-phase. When the point a is located beneath the encoding MR element 30, the position detecting MR element 31 faces a magnetic signal recorded in the position detecting track 21, and therefore the resistance of the MR element 31 is reduced. That is, when a current is caused to flow through the MR element 31, such an output signal as shown in FIG. 6B is obtained. This output signal is kept constant during the period when points a, b, c and d pass the MR element 30. When the point d leaves the MR element 30, the position detecting MR element 31 does not receive a magnetic signal, and the output signal disappears as shown in FIG. 6B.

Next, let us consider the output signal of V-phase. When the point a is located beneath the MR element 30, the resistance of the position detecting MR element 32 is reduced. When the point b leaves the MR element 30, the MR element 32 does not receive a magnetic field, and therefore the resistance of the MR element 32 takes an initial value. Thus, such an output signal as shown in FIG. 6C is obtained.

Further, let us consider the output signal of W-phase. When the point c passes the MR element 30, the position detecting MR element 33 is applied with a magnetic field, and therefore such an output signal as shown in FIG. 6D is obtained.

That is, in the 3-phase, 8-pole brushless motor, each of the output signals shown in FIGS. 6B, 6C and 6D is present for a period corresponding to a central angle of 45° and absent for the next period corresponding to a central angle of 45°, and thus the magnetic pole N or S of the brushless motor can be detected. Incidentally, in this case, the central angle of 45° corresponds to an electrical angle of 180°.

Further, the phase difference between the output signals shown in FIGS. 6B and 6C corresponds to an electrical angle of 120°, and therefore position detection can be made in the three phases.

As mentioned above, according to the present embodiment, the MR element supporting substrate can be made sufficiently small in size by arranging MR elements in a line.

Further, the MR elements can be deposited on the substrate by evaporation so that they lie in close proximity to each other on a line, and moreover uniform MR elements are obtained by evaporation. Thus, the substrate having the MR elements can be fabricated at a high yield rate, is suited to mass production, and therefore becomes inexpensive. Further, the present embodiment can perform a stable operation, since magnetic interference does not take place between the encoding portion and position detecting portion.

Furthermore, the present embodiment necessitates no magnetic bias.

Advantages of the present embodiment which include the above-mentioned, can be summarized in the following points.

(1) Since the area of the MR element supporting substrate can be made very small by arranging MR elements in a line, the substrate having the MR elements is small in size and inexpensive. Thus, an encoder with a position detecting device can be obtained which is high in yield rate and suited to mass production.

(2) Since the encoding MR element and each of the position detecting MR elements are arranged perpendicularly to each other and the recording direction of magnetic signal, namely, the direction of magnetization in the encoding track is made perpendicular to the direction of magnetization in the position detecting tracks, the magnetic field in the encoding track does not interfere with the magnetic field in the position detecting tracks, and therefore stable outputs are always obtained.

(3) Since each of the position detecting tracks includes the signal recording areas and non-recording areas, position detection can be made without applying a magnetic bias to each of the MR elements.

Angles corresponding to recording areas of magnetic signals in a track, can be appropriately selected in accordance with desired purposes.

Further, the MR elements may be arranged in a line having indentations.

While the above-mentioned embodiment is concerned with a brushless motor, the present invention is not limited to such a case but can be used, for example, to detect the position of a needle attached to the axis of a sewing machine, or to detect the angle of rotation in an information instrument. That is, the present invention is applicable to various technical fields.

We claim:

1. A position detecting device including a moving body provided on a surface thereof with a magnetic material, and magnetoresistive elements disposed opposite to and in close proximity to said magnetic material, comprising:
    an encoding track provided on said moving body and containing a magnetic signal recorded with a predetermined direction of magnetization;
    a plurality of concentric position detecting tracks provided on said moving body and containing a magnetic signal recorded in spaced areas of equal electrical angle with a direction of magnetization intersecting with said predetermined direction of magnetization of said encoding track; and
    magnetoresistive elements formed on an insulating substrate and facing said encoding track and said position detecting track, each of said magnetoresistive element being placed so as to intersect the direction of magnetization in a respective track facing said magnetoresistive element.

2. A position detecting device according to claim 1, wherein said direction of magnetization and said predetermined direction of magnetization intersect at right angles.

3. A position detecting device according to claim 1, wherein said moving body is attached to the rotating shaft of a brushless motor so as to be rotated by said motor, the number of position detecting tracks corresponding to the number of phases of the brushless motor.

4. A position detecting device according to claim 3, wherein, in each of said position detecting tracks, a magnetic signal is recorded at intervals corresponding to the electrical angle of 180° in P/2 recorded areas alternating with P/2 unrecorded areas, where P indicates the number of poles of the brushless motor.

5. A position detecting device according to claim 3, wherein a magnetic signal is recorded in said encoding track in the circumferential direction of said rotating body, and a magnetic signal is recorded in each of said position detecting tracks in the radial direction of said rotating body, and wherein the direction of a magnetoresistive element facing said encoding track is perpendicular to the direction of each of magnetoresistive elements facing said position detecting tracks.

6. A position detecting device according to claim 3, wherein the polarity of the magnetic signal in an area of a first one of said position detecting tracks is the same as the polarity of the magnetic signal in that area of a second position detecting track which is adjacent to said area of said first position detecting track.

7. A position detecting device for a brushless motor comprising:
   a rotating body attached to the rotating shaft of said brushless motor and provided on a surface thereof with a magnetic material;
   a circumferential encoding track provided on said rotating body and containing a magnetic signal recorded with a predetermined direction of magnetization;
   a plurality of circumferential position detecting tracks concentrically provided on said rotating body, each position detecting track containing a magnetic signal recorded in equally spaced sectors of equal electrical angle with a direction of magnetization intersecting with said predetermined direction of magnetization, the sectors in the respective position detecting tracks being offset with respect to the sectors of an adjacent track so that the magnetic signals recorded in adjacent tracks have a phase difference of 120°; and
   magnetoresistive element formed on an insulating substrate and disposed opposite to and in close proximity to said magnetic material so as to face said encoding track and said position detecting track, said magnetoresistive elements being arranged side by side by a track arranging direction, each of said magnetoresistive elements being placed so as to intersect the direction of magnetization in a track facing said magnetoresistive element.

8. A position detecting device according to claim 7, wherein said direction of magnetization and said predetermined direction of magnetization intersect at right angles.

9. A position detecting device according to claim 7, wherein the number of position detecting tracks corresponding to the number of phases of the brushless motor.

10. A position detecting device according to claim 7, wherein, in each of said position detecting tracks, a magnetic signal is recorded at intervals corresponding to the electrical angle of 180° in P/2 recorded sectors alternating with P/2 unrecorded sectors, where P indicates the number of poles of the brushless motor.

11. A position detecting device according to claim 7, wherein a magnetic signal is recorded in said encoding track in the circumferential direction of said rotating body, and a magnetic signal is recorded in each of said position detecting tracks in the radial direction of said rotating body, and wherein the direction of a magnetoresistive element facing said encoding track is perpendicular to the direction of each of magnetoresistive elements facing said position detecting tracks.

12. A position detecting device according to claim 1, wherein the polarity of the magnetic signal in a sector of a first one of said position detecting tracks is the same as the polarity of the magnetic signal in that sector of a second position detecting track which is adjacent to said sector of said first position detecting track.

* * * * *